(12) United States Patent
Arai et al.

(10) Patent No.: US 8,252,421 B2
(45) Date of Patent: Aug. 28, 2012

(54) GAS BARRIER FILM

(75) Inventors: Takashi Arai, Shiga (JP); Yasushi Tateishi, Shizuoka (JP); Saori Sumi, Shiga (JP); Kusato Hirota, Shiga (JP)

(73) Assignee: Toray Industries, Inc., Tokyo (JP)

( * ) Notice: Subject to any disclaimer, the term of this patent is extended or adjusted under 35 U.S.C. 154(b) by 550 days.

(21) Appl. No.: 12/442,166

(22) PCT Filed: Aug. 31, 2007

(86) PCT No.: PCT/JP2007/066968
§ 371 (c)(1),
(2), (4) Date: Mar. 20, 2009

(87) PCT Pub. No.: WO2008/035557
PCT Pub. Date: Mar. 27, 2008

(65) Prior Publication Data
US 2009/0263654 A1     Oct. 22, 2009

(30) Foreign Application Priority Data

Sep. 22, 2006    (JP) .................................. 2006-257775

(51) Int. Cl.
*B32B 15/08*    (2006.01)
(52) U.S. Cl. ...................... 428/423.1; 428/337; 428/339; 428/447; 428/423.7; 428/425.8; 428/425.9
(58) Field of Classification Search .......... 428/423–425, 428/337, 339, 447, 423.1, 423.7, 425.8, 425.9
See application file for complete search history.

(56) References Cited

U.S. PATENT DOCUMENTS

| | | | |
|---|---|---|---|
| 6,166,849 A * | 12/2000 | Coleman et al. .............. | 359/270 |
| 6,569,533 B1 | 5/2003 | Uchida et al. | |
| 6,866,949 B2 * | 3/2005 | Ota et al. ....................... | 428/702 |
| 2004/0185266 A1 * | 9/2004 | Nomura et al. ............. | 428/423.1 |
| 2008/0070043 A1 * | 3/2008 | Arai et al. .................. | 428/425.8 |
| 2011/0129654 A1 * | 6/2011 | Yoshida et al. ............... | 428/201 |

FOREIGN PATENT DOCUMENTS

| | | |
|---|---|---|
| EP | 1 801 161 A1 | 6/2007 |
| JP | 9-106926 A | 4/1997 |
| JP | 11-157008 A | 6/1999 |
| JP | 2001-98047 A | 4/2001 |
| WO | WO-2006/040965 A1 | 4/2006 |

* cited by examiner

*Primary Examiner* — Lorna M Douyon
*Assistant Examiner* — Tri V Nguyen
(74) *Attorney, Agent, or Firm* — Birch, Stewart, Kolasch & Birch, LLP

(57) ABSTRACT

The present invention relates to a gas barrier film where a polyurethane type resin layer and an inorganic layer are disposed in this order from a polyester type resin film side on at least one surface of a polyester type resin film, wherein the polyurethane type resin constituting said polyurethane type resin layer is a resin containing a skeleton represented by the following formula (1) and/or the following formula (2).

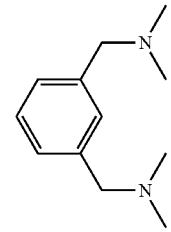

(1)

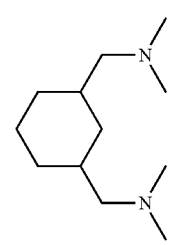

(2)

13 Claims, No Drawings

GAS BARRIER FILM

TECHNICAL FIELD

The present invention relates to a gas barrier film with excellent oxygen insulation property and water vapor insulation property, and particularly to a gas barrier film suitably used for packaging materials in foods, drugs and medicines, electronic components, and industrial materials.

BACKGROUND ART

Gas barrier films and packaging materials using the same have been well known. For example, as a material having a gas barrier property, an aluminum foil has been known. Since pinholes easily take place in this aluminum foil alone, which cannot be used except for a special usage, it is used almost as an intermediate layer in a laminated film. However, there are environment problems in recent years, as for a packaging material, there have been increasingly strong demands for reduction of volume by making it thinner and simplifying a laminate, so there is a tendency that an aluminum foil does not tend to be used as a packaging material. Since a laminated film using an aluminum foil is not transparent, when it is used as a packaging material, contents cannot be seen, so it is difficult to judge whether it is surely heat sealed or not.

Since thermoplastic resin films such as polyester type resin film and polyamide type resin film are excellent in strength, transparency and formability, they have been used as a packaging material in wide applications. However, since these thermoplastic resin films have high permeability to gases such as oxygen and water vapor, when they are used as package of products such as ordinary foods, retort-treatment foods, drugs and medicines, there is a case that the products are degraded and deteriorated due to storage for a long period of time.

Therefore, for a packaging material required for a gas barrier property, there has been often used a thermoplastic resin film that polyvinylidene chloride (hereinafter PVDC) emulsion or the like is coated on a polyolefin type resin film, polyamide type resin film, polyester type resin film such as polyethylene terephthalate. The thermoplastic resin film that a PVDC layer has been formed by coating exerts a high oxygen-barrier property not only in a low humidity but also in a high humidity, and also has high barrier properties to water vapor. However, this thermoplastic resin film that a PVDC layer has been coated has a fear of generating chlorine gas derived and dioxins from chlorine in PVDC in burning in waste treatment. Therefore, because there is a fear adversely affecting environments and human bodies to great extent, it has been strongly desired to shift to other materials.

As a gas barrier material not containing chlorine, polyvinyl alcohol (hereinafter PVA) film, and a coated film that PVA or ethylene-vinyl alcohol copolymer (hereinafter EVOH) is coated on a thermoplastic resin film are most well known. PVA and EVOH are very excellent in oxygen gas barrier property under dry environment. However, they have problems that the barrier property depends very largely on humidity and markedly deteriorates under high humidity conditions, and they have no water vapor barrier property and are easily degraded in hot water.

Regarding such problems, as a polymer that the lowering of gas barrier property of PVA and EVOH under high humidity is improved, a resin composition containing a partially neutralized material of PVA with polyacrylic acid or polymethacrylic acid is proposed (Patent document 1). A composition containing a vinyl polymer consisting mainly of PVA and polyitaconic acid, and a metal compound is also proposed (Patent document 2).

There is also proposed a vapor deposition film that on one surface of a thermoplastic resin film such as polyester type resin film, using a physical vapor growth method such as vacuum deposition method, for example, a deposited film of metal such as aluminum, or a deposited film of inorganic oxide such as aluminum oxide and silicon oxide is provided (Patent documents 3 to 5). However, the gas barrier property was unstable and insufficient largely depending on surface roughness and thermal shrinkage of the thermoplastic resin film as a substrate.

As a technique to make up for the drawbacks described above, there is proposed a gas barrier film that a polyurethane type polymer layer is provided on a thermoplastic resin film, and a metal or metal oxide-covering layer is formed thereon (Patent document 6).

Patent document 1: Japanese Unexamined Patent Publication No. 10-237180 (1998) (paragraph numbers [0060] to [0065])

Patent document 2: Japanese Unexamined Patent Publication No. 2004-35833 (paragraph numbers [0061] to [0066])

Patent document 3: Japanese Unexamined Patent Publication No. 8-269689 (1996) (paragraph numbers [0004] to [0005])

Patent document 4: Japanese Unexamined Patent Publication No. 2000-185374 (paragraph numbers [0016] to [0018])

Patent document 5: Japanese Unexamined Patent Publication No. 11-322982 (1999) (paragraph numbers [0007] to [0033])

Patent document 6: Japanese Unexamined Patent Publication No. 2001-10003 (paragraph numbers [0035] to [0041])

DISCLOSURE OF THE INVENTION

Problems to be Solved by the Invention

However, the proposals in Patent documents 1 and 2 each aimed at improving barrier properties under high humidity by crosslinking with ester bonds. In these methods, to enhance gas barrier properties of film by developing esterification sufficiently, it needs to react by heating at high temperature, so there is a problem of productivity.

In the proposals in Patent documents 3 to 6, for use in a packaging application or an industrial material application that very high gas barrier properties are required, the gas barrier properties are still insufficient.

Then an object of the present invention is, in the light of background of conventional arts, to provide a gas barrier film having no fear of environmental pollution due to halogen, and having excellent barrier properties to gases such as oxygen and water vapor, and good productivity.

Means to Solve the Problems

The present invention adopts the following constitutions to solve such problems.

(i) A gas barrier film of the present invention relates to a gas barrier film where a polyurethane type resin layer and an inorganic material layer are disposed in this order from a polyester type resin film side on at least one surface of a polyester type resin film, wherein the polyurethane type resin constituting said polyurethane type resin layer is a resin containing a skeleton represented by the following formula (1) and/or the following formula (2).

[Formula 1]

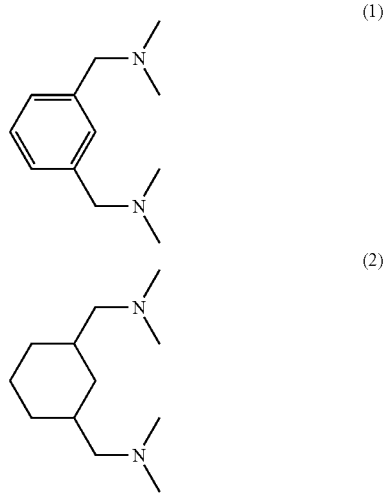

(ii) According to a preferable aspect of the gas barrier film of the present invention, in the gas barrier film described in (i), a metal anchor deposited layer is disposed between said polyurethane type resin layer and inorganic material layer.

(iii) According to a preferable aspect of the gas barrier film of the present invention, in the gas barrier film described in (i) or (ii), the polyester type resin constituting said polyester type resin film is any of polyethylene terephthalate, polyethylene naphthalate and polylactic acid.

(iv) According to a preferable aspect of the gas barrier film of the present invention, in the gas barrier film described in any one of (i) to (iii), the coated amount of said polyurethane type resin layer is in a range of 0.01 to 2.0 g/m².

(v) According to a preferable aspect of the gas barrier film of the present invention, in the gas barrier film described in any one of (ii) to (iv), the deposited amount of said metal anchor deposited layer is in a range of 5 to 1000 ng/cm².

(vi) According to a preferable aspect of the gas barrier film of the present invention, in the gas barrier film described in any one of (ii) to (v), the metal constituting said metal anchor deposited layer is copper.

(vii) According to a preferable aspect of the gas barrier film of the present invention, in the gas barrier film described in any one of (i) to (vi), the inorganic material constituting said inorganic material layer is a metal or a metal oxide.

(viii) According to a preferable aspect of the gas barrier film of the present invention, in the gas barrier film described in (vii), the metal constituting said inorganic material layer is aluminum.

(ix) According to a preferable aspect of the gas barrier film of the present invention, in the gas barrier film described in (vii), the metal oxide constituting said inorganic material layer is at least one kind of inorganic oxide selected from the group consisting of aluminum oxide, silicon oxide and silicon oxide-nitride.

Effect of the Invention

The present invention provides a gas barrier film which not only contains no halogen such as chlorine, but also is more excellent in oxygen barrier property and water vapor barrier property to the metal deposited film or metal oxide deposited film conventionally proposed. No heat treatment at high temperature in forming a gas barrier layer is required and a gas barrier film with excellent productivity is obtained.

Further, according to a preferable aspect of the present invention, a gas barrier film is obtained such that it is transparent, so contents can be visually confirmed, and it can adapt to cooking utilizing an electric oven.

BEST MODE FOR CARRYING OUT THE INVENTION

The present investors have keenly studied on the foregoing problems, namely, a gas barrier film having no fear of environmental pollution due to halogen, and having excellent barrier properties to gases such as oxygen and water vapor, and excellent production applicability. As a result, the present investors have found that by combining a thermoplastic resin film as a substrate, a resin layer formed from a specific resin and an inorganic material layer, a gas barrier film having no halogen and showing high gas barrier properties, and also excellent applicability of film production is obtained.

The gas barrier film of the present invention is one that a polyurethane type resin layer and an inorganic material layer are formed in this order from a polyester type resin film side on at least one surface of a polyester type resin film, wherein the polyurethane type resin constituting said polyurethane type resin layer is a resin containing a skeleton represented by the following formula (1) and/or the following formula (2), thereby enabling higher gas barrier properties than the conventional film.

[Formula 2]

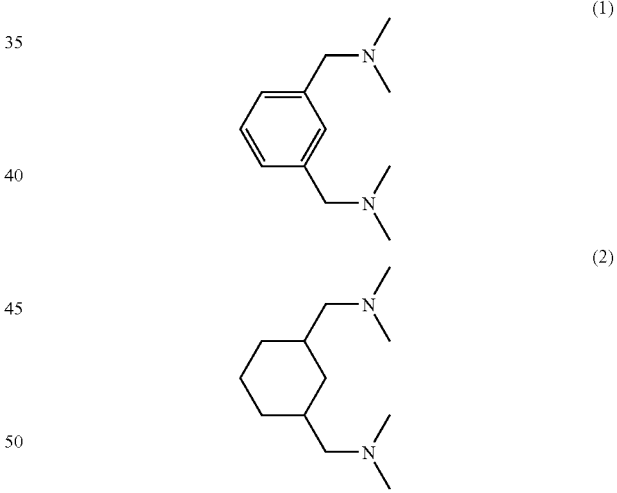

Generally, an inorganic material layer has a gas barrier property, but has defects such as pinhole and crack, so the gas barrier is often insufficient. Surface roughness, thermal shrinkage, surface elasticity and the like of a polyester type resin film as a substrate are related to the number of defective sites. Namely it is thought that surface roughness, thermal shrinkage, surface elasticity and the like of a polyester type resin film are important factors to determine a gas barrier property. In the present invention, by forming a polyurethane type resin layer containing the specific molecular structure on a polyester type resin film, a surface to be deposited of a polyester type resin film as a substrate is smoothed and the gas barrier property is remarkably improved by an effect of increasing thermal dimensional stability.

Hereinafter, a gas barrier film of the present invention will be explained in detail.

As a polyester type resin constituting a polyester type resin film used as a substrate in the present invention, polyester type films such as polyethylene terephthalate, polyethylene naphthalate and polylactic acid are listed.

As the polyester type resin constituting a polyester type resin film used in the present invention, there are exemplified polyethylene terephthalate whose constitutional unit is 80 mol % or more of ethylene terephthalate, polyethylene naphthalate whose constitutional unit is 80 mol % or more of ethylene naphthalate, polylactic acid film whose constitutional unit is 80 mol % or more of polylactic acid, or the like, but it is not particularly limited. A polyester type resin may be a copolymer, as a copolymer component, for example, there can be used diol components such as propylene glycol, diethylene glycol, neopentyl glycol and cyclohexane dimethanol; carboxylic acid components such as isophthalic acid, adipic acid, azelaic acid, sebacic acid, and the ester formable derivatives.

To a polyester type resin film, if necessary, for example, additives such as antistatic agent, ultraviolet absorber, stabilizer, antioxidant, plasticizer, lubricant, and filler can be added in a range not damaging the effect of the present invention.

Since the gas barrier property of a film that an inorganic material layer is provided by deposition or the like is affected by thermal dimensional stability of a polyester type resin film as a substrate, a polyester type resin film is preferably a film stretched in biaxial directions. For a polyester type resin film, if necessary, for example, discharge treatment such as corona discharge and plasma discharge or surface treatment such as acid treatment may be carried out.

The thickness of polyester type resin film is, from the reasons such as stability and costs in forming an inorganic material layer, preferably in a range of 1 to 100 Mm, more preferably in a range of 5 to 50 μm, and particularly preferably, a range of about 10 to 30 μm is practical.

A polyurethane type resin used in the present invention contains a skeleton represented by the following formula (1) and/or the following formula (2) in the structure, which may be either an alicyclic compound or aromatic compound.

[Formula 3]

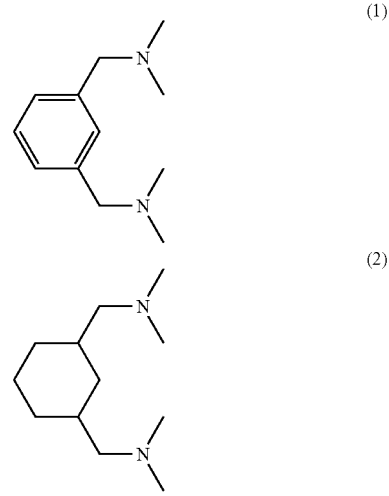

(1)

(2)

A polyurethane type resin containing a skeleton represented by the formula (1) in the structure can produce π electron interaction between aromatic rings. It can form hydrogen bond between polymer chains because it contains a nitrogen atom of high electronegativity. On the other hand, a polyurethane type resin containing a skeleton represented by the formula (2) in the structure can also form hydrogen bond between polymer chains because it contains a nitrogen atom of high electronegativity. Further, the skeleton represented by the formulas (1) and (2) is a structure with a relatively hard molecular chain, a polyurethane type resin containing such structure has a high glass transition temperature and excellent thermal dimensional stability.

A polyurethane type resin containing a skeleton represented by the formulas (1) and (2) in the structure exhibits the above-described features, which are preferable features from the following viewpoints.

As factors to determine a gas barrier property of a film that a polyurethane type resin layer and an inorganic material layer are formed in this order on a polyester type resin film, surface roughness, thermal dimensional stability, crystallinity and the like on a surface that an inorganic material layer is formed, that is, a polyurethane type resin layer are listed. The factors are derived from a polymer structure forming the polyurethane type resin layer. For example, thermal dimensional stability and crystallinity are derived from cohesive force of polymer and skeleton structure. Namely, polymer chains containing a functional group, aromatic ring or atom capable of intermolecular interactions such as hydrogen bond, π electron interaction and static interaction in the structure tend to agglutinate strongly due to interactions as a driving force. As a result, cohesive energy density and orientation become high, so thermal dimensional stability and crystallinity are improved.

From these reasons, a polyurethane type resin is preferably an alicyclic compound and aromatic compound containing a skeleton represented by the foregoing formula (1) and/or the foregoing formula (2) in the structure.

A polyurethane type resin is generally obtained by a urethane reaction of a diisocyanate component and a diol component, the skeleton structure represented by the formulas (1) and (2) may be contained in at least either one of a diisocyanate component and a diol component, and may be contained in both. Further, one obtained by chain extension reaction or cross-linking reaction with an amine component can be used.

The diisocyanate component includes aromatic diisocyanate, aromatic aliphatic diisocyanate, alicyclic diisocyanate and aliphatic diisocyanate.

Examples of aromatic diisocyanate include m- or p-phenylene diisocyanate, 4,4'-diphenyl diisocyanate, 1,5-naphthalene diisocyanate (NDI), 4,4'-, 2,4'- or 2,2'-diphenylmethane diisocyanate (MDI), 2,4- or 2,6-tolylene diisocyanate (TDI), and 4,4'-diphenylether diisocyanate.

Examples of aromatic aliphatic diisocyanate include 1,3- or 1,4-xylylene diisocyanate (XDI), and 1,3- or 1,4-tetramethylxylylene diisocyanate (TMXDI).

Examples of alicyclic diisocyanate include 1,4-cyclohexane diisocyanate, 1,3-cyclohexane diisocyanate, 3-isocyanatomethyl-3,5-5-trimethylcyclohexyl isocyanate (isophorone diisocyanate; IPDI), 4,4'-, 2,4- or 2,2'-dicyclohexylmethane diisocyanate (hydrogenated MDI), methyl-2,4-cyclohexane diisocyanate, methyl-2,6-cyclohexane diisocyanate, and 1,3- or 1,4-bis(isocyanatomethyl)cyclohexane (hydrogenated XDI).

Examples of aliphatic diisocyanate include trimethylene diisocyanate, tetramethylene diisocyanate, hexamethylene diisocyanate (HDI), pentamethylene diisocyanate, 1,2-propylene diisocyanate, 1,2-, 2,3- or 1,3-butylene diisocyanate, and 2,4,4- or 2,2,4-trimethylhexamethylene diisocyanate.

Among these diisocyanate components, from the foregoing reasons, as an aromatic diisocyanate containing the skeleton structure represented by the formulas (1) and (2), XDI and TMXDI are preferable, and as an alicyclic diisocyanate, hydrogenated MDI is preferable.

These diisocyanate components can be used alone or in combination of two or more kinds thereof. Further, if necessary, polyisocyanate of three or more functionalities can be in concomitant use.

The diol component includes a wide range of diols from a diol with low molecular weight to an oligomer. Examples of diol component include alkylene glycols with C2 to C12 (for example, ethylene glycol, 1,3- or 1,2-propylene glycol, 1,4-, 1,3- or 1,2-butanediol, 1,5-pentanediol, 3-methyl-1,5-pentanediol, 2,4-diethyl-1,5-pentanediol, 2,2,4-trimethylpentane-1,3-dilol, 1,6-hexanediol, neopentyl glycol, 1,5- or 1,7-heptanediol, 1,8-octanediol, 1,9-nonanediol, 1,10-decanediol, 1,11-undecanediol, and 1,12-dodecanediol); polyether diols such as polyoxyalkylene (with C2 to C4) glycol (for example, diethylene glycol, triethylene glycol, tetraethylene glycol, pentaethylene glycol, hexaethylene glycol, heptaethylene glycol, dipropylene glycol, tripropylene glycol, tetrapropylene glycol, pentapropylene glycol, hexapropylene glycol, heptapropylene glycol, dibutylene glycol, tributylene glycol, and tetrabutylene glycol); aromatic diols (for example, bisphenol A, bishydroxyethyl terephthalate, catechol, resorcinol, hydroquinone, 1,3- or 1,4-xylylenediol, or mixture thereof); and alicyclic diols (for example, hydrogenated bisphenol A, hydrogenated xylylenediol, and cyclohexanediol, cyclohexanedimethanol).

Among these diol components, examples of diol components containing the skeleton structure represented by the formulas (1) and (2) include 1,3- or 1,4-xylylenediol as an aromatic diol, and hydrogenated xylylenediol as an alicyclic diol.

These diol components can be used alone or in combination of two or more kinds thereof. Further, if necessary, polyol of three or more functionalities can be in concomitant use.

If necessary, as a chain extension agent and crosslinking agent, a diamine component can be used. Examples of the diamine component include hydrazine, aliphatic diamine (for example, ethylenediamine, trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine); aromatic diamine (for example, m- or p-phenylenediamine, 1,3- or 1,4-xylylenediamine, or mixture thereof); and alicyclic diamine (for example, hydrogenated xylylenediamine, bis(4-aminocyclohexyl)methane, isophoronediamine, and bis(4-amino-3-methylcyclohexyl)methane), besides, diamines having a hydroxyl group such as 2-hydrazinoethanol and 2-[(2-aminoethyl)amino]ethanol.

Among these diamine components, from the viewpoints of orientation, thermal dimensional stability and crystallinity, ordinarily, there are used a diamine component with low molecular weight having carbon numbers of 8 or less, preferably diamine having carbon numbers of 6 or less, in particular, hydrazine, ethylenediamine, tetramethylenediamine, pentamethylenediamine, hexamethylenediamine, 2-hydrazinoethanol, 2-[(2-aminoethyl)amino]ethanol and the like. These diamine components can be used alone or in combination of two or more kinds thereof. Further, if necessary, polyamine of three or more functionalities can be in concomitant use.

The number average molecular weight of a polyurethane type resin synthesized using the above-described raw materials can be selected approximately from a range of preferably 800 to 1,000,000, more preferably 800 to 200,000, and further preferably 800 to 100,000. By setting a molecular weight to 800 or more, a coated film formed with a polyurethane type resin exhibits a sufficient strength. In the case of coating on a polyester type resin film, film forming becomes easy because a polyurethane type resin itself has cohesive force. On the other hand, by setting a molecular weight to 1,000,000 or less, the resin viscosity of polyurethane type resin is suppressed low even in a solvent, and workability becomes good in coating on a polyester type resin film.

A polyurethane type resin layer can be formed by coating a polyurethane type resin on a polyester type resin film. Examples of solvent for a coating liquid to form the polyurethane type resin layer of the present invention include toluene, xylene, ethyl acetate, butyl acetate, acetone, methyl ethyl ketone, methyl isobutyl ketone, tetrahydrofuran, dimethylformamide, dimethylacetamide, methanol, ethanol, and water. The property of the coating liquid may be either an emulsion type or a solution type.

To a coating liquid used in the present invention, a heat stabilizer, antioxidant, toughening agent, pigment, degradation preventing agent, weather resistant agent, flame retardant, plasticizer, mold release agent, lubricant and the like can be added in a range not damaging the characteristic.

As a heat stabilizer, an antioxidant and a degradation preventing agent, for example, hindered phenols, phosphorous compounds, hindered amines, sulfur compounds, copper compounds and halides of alkali metal or a mixture thereof are listed.

Examples of toughening agent include clay, talc, calcium carbonate, zinc carbonate, wollastonite, silica, alumina, magnesium oxide, calcium silicate, sodium aluminate, sodium aluminosilicate, magnesium silicate, glass balloon, carbon black, zinc oxide, zeolite, hydrotalcite, metal fiber, metal whisker, ceramic whisker, potassium titanate whisker, boron nitride, graphite, glass fiber, and carbon fiber.

In a coating liquid used in the present invention, an inorganic lamellar compound may be mixed. Preferable examples of the inorganic lamellar compound can include montmorilonite, bidelite, saponite, hectorite, sauconite, vermiculite, fluorine mica, white mica, palagonite, gold mica, black mica, lepidolite, margarite, clintonite, and anandite, in particular, swellable fluorine mica or montmorilonite is preferably used.

These inorganic lamellar compounds may be a natural one, or one synthesized or modified artificially, and one treated with organic materials such as onium salt.

The method for forming a polyurethane type resin layer on a polyester type resin film is not particularly limited, it may be an in-line coating method of coating a polyurethane type resin in a step of forming a polyester type resin film, or an off-line coating method of coating a polyurethane type resin as a post treatment on a film after film formation. As a technique of coating, various methods can be applied depending on a polyester type resin film. For example, there can be utilized a roll coating method, dip coating method, bar coating method, die coating method, gravure roll coating method and the like, and combined method thereof. Above all, a gravure roll coating method is a preferable method because of an increase in stability of coating layer-forming composition.

The coated amount of polyurethane type resin layer is preferably in a range of 0.01 to 2 g/m$^2$, and more preferably in a range of 0.01 to 1 g/m$^2$. When the coated amount of polyurethane type resin layer is less than 0.01 g/m$^2$, even in an in-line coating method capable of forming a relatively thin resin film, defects such as film break and repellent easily take place, so it makes difficult to form a uniform resin film. As a result, there is a case that a sufficient gas barrier property is not exhibited even when an inorganic material layer is formed on a resin layer. On the other hand, when the coated amount of polyurethane type resin layer is more than 5 g/m$^2$, there is a case that drying conditions in coating become high temperature and long time for sufficiently evaporating a solvent. As a result, deformation such as curl of film tends to take place. Further, production costs sometimes increase.

In the present invention, in the case of forming/laminating a polyurethane type resin layer on a polyester type resin film, depending on a solvent used in a coating liquid, a coating layer is dried preferably at 70° C. or more, and more preferably at 90° C. or more. If drying temperature is lower than 70° C., there is a case that drying a coated film becomes insufficient. As a result, there is a case that a film with a sufficient gas barrier property is not obtained. There is a case that a residual solvent left in a film, which does not meet usage as packaging materials, in particular, packaging materials for foods. Regarding a heat treatment time for drying, if drying time is too short, being similar to drying temperature, drying becomes insufficient, thus it is ordinarily one second or more, and preferably three seconds or more.

Examples of inorganic material constituting an inorganic material layer formed on a polyurethane type resin layer in the present invention include a metal and an inorganic oxide. Further, examples of inorganic oxide include metal oxide and nitrided oxide. Further, the inorganic material layer can be formed by vapor deposition method, spattering method, ion plating method, plasma gas phase growth method (CVD) and the like. However, from consideration of productivity, a vacuum deposition method is most excellent at this time. As a heating means of vacuum deposition equipment by the vacuum deposition method, electron beam-heating method, resistance heating method and induction heating method are preferable.

In the present invention, a metal anchor deposited layer may be provided between the inorganic material layer and polyurethane type resin layer. The metal anchor deposited layer is formed by a method that a cathode metal of discharging electrode is spattered on a plastic film under a glow discharge, and the plastic film surface is activated at the same time. In this case, the pressure range is $10^{-1}$ to $10^{-4}$ Torr, power supply frequency is DC to about 50 MHz, power supply voltage is 50 to 10 kV, discharge electric current density is 1 to 400 mA·min/m$^2$, and it is preferable that the kind of discharge gas in discharge atmosphere is suitably chosen from oxygen, nitrogen, argon, carbon dioxide, water vapor and mixed gas containing these. The thus formed metal anchor deposited layer enhances adhesive force between a substrate film and an inorganic material layer, in particular, water-resistant adhesive force. As a metal for forming the metal anchor deposited layer, which is formed by aluminum, chromium, iron, nickel, copper, zinc, silver, indium, tin and their oxide. In particular, copper is preferably used from the points of improvement effect of adhesion to a substrate film, cost and production efficiency. This metal anchor deposited layer can contain a product of discharge gas such as metal nitride in a range not damaging the aim.

In the present invention, the deposited amount of the metal anchor deposited layer is preferably in a range of 5 to 1000 ng/cm$^2$. If the deposited amount is less than 5 ng/cm$^2$, there is a case that improvement effect of adhesion becomes insufficient. On the other hand, if the deposited amount is more than 1000 ng/cm$^2$, there is a case that productivity deteriorates because the treatment speed becomes low.

Examples of metal constituting the inorganic material layer in the present invention can include aluminum, silicon, titanium, zirconium, tin, and magnesium. In particular, aluminum is preferable from the points of gas barrier properties, costs and production efficiency.

Examples of metal oxide constituting the inorganic material layer in the present invention can include aluminum oxide, magnesium oxide, titanium oxide, tin oxide, indium oxide alloy, and silicon oxide. Examples of metal oxide-nitride can include silicon oxide-nitride. In particular, inorganic oxides such aluminum oxide, silicon oxide and silicon oxide-nitride are preferably used from the points of gas barrier properties and production efficiency.

The film thickness of an inorganic material layer is suitably chosen according to the kind and constitution of inorganic material used, generally, it is preferably in a range of 2 to 300 nm, more preferably in a range of 3 to 100 nm, and further preferably in a range of 5 to 50 nm. If the film thickness exceeds 300 nm, since its flexibility (softness) is lowered, there is a case that crack, pinhole and the like take place in a thin film by an external force due to folding and stretching after film formation (in a post-treatment process and the like). As a result, gas barrier properties sometimes deteriorate. This is remarkable particularly when an inorganic material layer is composed of metal oxide. Since a speed for forming an inorganic material layer decreases, there is a case that productivity is markedly lowered. On the other hand, if being less than 2 nm, it is difficult to obtain a uniform film, and further there is a case that the film thickness is not sufficient, and gas barrier properties are not sufficient.

In the present invention, further, other resin layer can be formed to provide various characteristics on an inorganic material layer. For example, since an inorganic material layer is rigid, there is a problem that crack and pinhole take place by bending in a post treatment such as printing and laminating, and gas barrier properties are markedly lowered. To prevent the lowering of gas barrier properties, a method of forming a resin layer on an inorganic material layer is useful. By forming a resin layer on an inorganic material layer, it is possible to provide boiling-water resistance, retort resistance, printability and the like. For providing a film having such inorganic material layer with various characteristics, a method of forming a resin layer on the inorganic material layer is effective. As a resin used in forming a resin layer on an inorganic material layer for these aims, it may be suitably chosen depending on a desired characteristic, and various resins can be used. Examples of resin composition for forming a resin layer can include an acryl type resin, polyurethane type resin, polyester type resin, and vinyl acetate type resin, these may be the respective copolymers, and can be suitably chosen depending on a desired characteristic.

Although the thin film layer formed with inorganic materials has gas barrier properties, it has defects such as pinhole and crack, thus, the gas barrier properties are often incomplete. Therefore, by providing other resin layer having a gas barrier property to the inorganic material layer, the gas barrier properties can be more improved by the fact that the minute defects are filled and the gas barrier property of the resin itself is also acted at the same time.

In the present invention, as a resin having gas barrier properties for laminating on an inorganic material layer, if it is formed into a film of 10 μm thickness, a resin that at least one of oxygen transmittance (unit: cc/(m$^2$·day·atm)) at 23° C. and humidity 0% as well as water vapor transmittance (unit: g/(m$^2$·day)) at 40° C. and humidity 90% is 10 or less can be listed. As a method for laminating a resin having gas barrier properties, wet coating method can be suitably used. For example, there can be utilized a roll coating method, dip coating method, bar coating method, die coating method, gravure roll coating method and the like, and combined method thereof. As a resin coating material having gas barrier properties used in the wet coating method, it may be an aqueous coating material, a water-dispersible coating material or an organic solvent type coating material, and as a gas barrier resin, known resins can be used such as polyvinyl alcohol, ethylene-vinyl acetate copolymer and MXD-nylon.

The gas barrier film of the present invention is suitably used for packaging materials in foods, drugs and medicines, electronic components, and industrial materials. In particular, for packaging materials in foods, drugs and medicines, a film with a small oxygen transmittance and water vapor transmittance is suitably used because it prevents deterioration of contents, so the gas barrier film of the present invention is useful.

EXAMPLES

Next, the gas barrier film of the present invention will be specifically explained with reference to Examples. In Examples, "part" means "part by weight" unless otherwise specified.

<Evaluation Method of Characteristics>

The evaluation methods of characteristics used in the present invention are as follows.

(1) Oxygen Transmittance

In the condition of temperature at 23° C. and humidity of 0% RH, using an oxygen transmittance measuring instrument (machine name, (trademark) "OXTRAN" 2/20) manufactured by MOCON Corporation USA, it was measured on the basis of B method (equal pressure method) described in JIS K7126 (year 2000 edition). One sample was cut to two test pieces, each test piece was measured once, and an average of two measurements was defined as the value of oxygen transmittance for the sample.

(2) Water Vapor Transmittance

In the condition of temperature at 40° C. and humidity of 90% RH, using an water vapor transmittance measuring instrument (machine name, (trademark) "Permatoran" W3/31) manufactured by MOCON Corporation USA, it was measured on the basis of B method (infrared sensor method) described in JIS K7129 (year 2000 edition). One sample was cut to two test pieces, each test piece was measured once, and an average of two measurements was defined as the value of water vapor transmittance for the sample.

(3) Deposited Amount of Anchor Deposited Layer

One sample was cut to two test pieces of 4 cm square. This test piece was dissolved in a dilute nitric acid, then, added with 25 ml of distilled water to be a constant volume. This constant-volume solution was measured by a heat atomic absorption method for determination of the deposited amount of metal. An average of measuring results done by two test pieces was defined as the deposited amount of anchor deposited layer for the sample.

(4) Thickness of Inorganic Material Layer

The cross-section photograph of a test piece was taken by a transmission electron microscope (H-7100FA model manufactured by Hitachi, Ltd), and the thickness was actually measured on the photograph, and divided by photograph magnification ratio to obtain an actual thickness. One sample was cut to two test pieces, each test piece was measured at two places, and an average of four measurements obtained was defined as the thickness of inorganic material layer for the sample.

(5) Total Light Transmittance

Using a direct reading type haze meter (HGM-20P manufactured by Suga Test Instruments Co., Ltd.), it was measured on the basis of the method of JIS K7361 (year 1997 edition). One sample was cut to three test pieces, each test piece was measured and an average of the results was defined as the total light transmittance for the sample.

(6) Haze

Using a direct reading type haze meter (HGM-20P manufactured by Suga Test Instruments Co., Ltd.), it was measured on the basis of the method of JIS K7361 (year 1997 edition). One sample was cut to three test pieces, each test piece was measured and an average of the results was defined as the haze for the sample.

(7) Water Resistant Adhesive Force

Twenty parts of an adhesive agent for dry lamination, AD-503 manufactured by Toyo-Morton, Ltd., 1 part of a hardening agent, CAT-10 manufactured by Toyo-Morton, Ltd., and 20 parts of ethyl acetate were weighted, and stirred for 30 minutes, thereby to prepare an adhesive solution for dry lamination with 19 wt % in solid content concentration.

This adhesive solution was coated by a wire bar on the surface of deposited layer of the gas barrier film obtained, dried at 80° C. for 45 seconds to form an adhesive layer of 3.5 µm. Next, anon-stretched polypropylene film ZK93K as a sealant film manufactured by Toray Advanced Film Co., Ltd. was disposed on the adhesive layer so that the corona-treated surface was faced to the adhesive layer and attached using a hand roller. This laminated film was aged in an oven heated at 40° C. for 2 days, thereby to obtain a laminated film for measurement of adhesion strength.

The laminated film obtained was cut to a slip-shaped sample of 15 mm in width (TD direction) and 200 mm in length (MD direction). The adhesion strength between the substrate film and sealant film was measured as follow: the substrate film was gripped at one short side of the strip-shaped sample and a sealant film was gripped at the other short side, using a tensile tester, the sample was pulled at a tensile speed of 300 mm/min in T-type striping (stripped plane angel: 90°). In this case, the measurement was conducted while applying water to the stripped port, and this was defined as the evaluation of water resistant adhesive force. Additionally, the measurement was done for two samples, and an average of two measured values was defined as the value of adhesion strength.

Example 1

429.1 parts of 1,3-xylylene diisocyanate, 35.4 parts of dimethylolpropionic acid, 61.5 parts of ethylene glycol and 140 parts of acetonitrile as a solvent were mixed, and reacted under nitrogen atmosphere at 70° C. for 3 hours to obtain a carboxylic group-containing polyurethane prepolymer solution. Next, this carboxylic group-containing polyurethane prepolymer solution was neutralized with 24.0 parts of triethylamine at a temperature of 50° C. This polyurethane prepolymer solution (267.9 parts) was dispersed in 750 parts of water by a homo-disperser, and subjected to chain extension reaction with 35.7 parts of 2-[(2-aminoethyl)amino]ethanol, by distilling out acetonitrile, thereby obtaining an aqueous dispersion of polyurethane type resin 1 containing a skeleton structure represented by the formula (1) with a solid content of 25 wt %. To the aqueous dispersion (10 parts) of the thus obtained polyurethane type resin 1, 35 parts of water and 5 parts of methanol were added as a diluting solvent, and stirred for 30 minutes to obtain a coating liquid 1 with 5% in solid content concentration.

Next, on the corona discharge-treated surface side of a biaxially stretched polyethylene terephthalate film of 12 μm thickness that one surface was subjected to corona discharge treatment (manufactured by Toray Industries, Inc. "Lumilar" (trademark) 12T705), the coating liquid 1 was coated using a wire bar for the coated amount after drying to be 0.2 g/m², and dried at 120° C. for 20 seconds to obtain a coating film 1.

Next, on a film roll of abiaxially stretched polyethylene terephthalate film of 12 μm thickness as a carrier film for vapor deposition (manufactured by Toray Industries, Inc. "Lumilar" (trademark) 12T705), a plurality of the coating films 1 cut to A4 size were attached so that the polyurethane resin layer surface was faced outside. Subsequently, using a winding type vacuum deposition apparatus, on the polyurethane resin layer surface, by spattering an ionized oxygen gas onto a target composed of 99.9% copper under a plasma atmosphere of 1 Pa, a copper-deposited layer of 10 ng/cm² in average thickness was formed. Subsequently, aluminum melted and evaporated from a crucible at $5 \times 10^{-4}$ torr was deposited thereon to form aluminum-deposited layer with 1.5Ω in surface resistance and 20 nm in thickness. Lastly, the film of A4 size was detached from the carrier film for vapor deposition to obtain a gas barrier film 1.

Example 2

439.1 parts of 1,4-bis(isocyanatomethyl)cyclohexane, 35.4 parts of dimethylolpropionic acid, 61.5 parts of ethylene glycol and 140 parts of acetonitrile as a solvent were mixed, and reacted under nitrogen atmosphere at 70° C. for 3 hours to obtain a carboxylic group-containing polyurethane prepolyer solution. Next, this carboxylic group-containing polyurethane prepolyer solution was neutralized with 24.0 parts of triethylamine at a temperature of 50° C. This polyurethane prepolyer solution (267.9 parts) was dispersed in 750 parts of water by a homo-disperser, and subjected to chain extension reaction with 35.7 parts of 2-[(2-aminoethyl)amino]ethanol, by distilling out acetonitrile, thereby obtaining an aqueous dispersion of polyurethane type resin 2 containing a skeleton structure represented by the formula (2) with a solid content of 25 wt %. To the aqueous dispersion (10 parts) of the thus obtained polyurethane type resin 2, 35 parts of water and 5 parts of methanol were added as a diluting solvent, and stirred for 30 minutes to obtain a coating liquid 2 with 5% in solid content concentration.

Next, on the treated surface side of abiaxially stretched polyethylene terephthalate film of 12 μm thickness that one surface was subjected to corona discharge treatment (manufactured by Toray Industries, Inc. "Lumilar" (trademark) 12T705), the coating liquid 2 was coated using a wire bar for the coated amount after drying to be 0.2 g/m², and dried at 120° C. for 20 seconds to obtain a coating film 2.

Next, on a film roll of abiaxially stretched polyethylene terephthalate film of 12 μm thickness as a carrier film for vapor deposition (manufactured by Toray Industries, Inc. "Lumilar" (trademark) 12T705), a plurality of the coating films 2 cut to A4 size were attached so that the polyurethane resin layer surface was faced outside. Subsequently, in the same manner as the method described in Example 1, a copper-deposited layer and an aluminum-deposited layer were formed to obtain a gas barrier film 2.

Example 3

Polyethylene terephthalate resin pellets were extruded from a nozzle of an extruder, casted on a cooling drum while being in concomitant use of static adhesion method to obtain an amorphous polyester sheet. The amorphous polyester sheet was stretched at 90° C. in the longitudinal direction by 3.4 times, then, the coating liquid 1 prepared by the method described in Example 1 was coated on one surface of the amorphous polyester sheet by a wire bar method, further stretched at 110° C. in the lateral direction by 2.9 times, and heat-treated at a temperature of 228° C., thereby to obtain a coating polyester film 3 of 0.1 g/m² in coated amount and 40 μm in thickness. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 3 cut to A4 size were attached so that the polyurethane resin layer surface was faced outside. Subsequently, in the same manner as the method described in Example 1, a copper-deposited layer and an aluminum-deposited layer were formed to obtain a gas barrier film 3.

Example 4

A coating film 4 was obtained in the same way as Example 1 except that a biaxially stretched polyethylene terephthalate film of 12 μm thickness that one surface was subjected to corona discharge treatment (manufactured by Toray Industries, Inc. "Lumilar" (trademark) 12T705) was changed to a biaxially stretched polyethylene naphtalate film of 12 μm thickness that one surface was subjected to corona discharge treatment. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 4 cut to A4 size were attached so that the polyurethane resin layer surface was faced outside. Subsequently, in the same manner as the method described in Example 1, a copper-deposited layer and an aluminum-deposited layer were formed to obtain a gas barrier film 4.

Example 5

A coating film 5 was obtained in the same way as Example 1 except that a biaxially stretched polyethylene terephthalate film of 12 μm thickness that one surface was subjected to corona discharge treatment (manufactured by Toray Industries, Inc. "Lumilar" (trademark) 12T705) was changed to a stretched polylactic acid film of 15 μm thickness that one surface was subjected to corona discharge treatment. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 5 cut to A4 size were attached so that the polyurethane resin layer surface was faced outside. Subsequently, in the same manner as the method described in Example 1, a copper-deposited layer and an aluminum-deposited layer were formed to obtain a gas barrier film 5.

Example 6

A coating film 1 was obtained in the same manner as the method described in Example 1. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 1 cut to A4 size were attached so that the polyurethane resin layer surface was faced outside. Subsequently, using a winding type vacuum deposition apparatus, on the polyurethane resin layer surface, an aluminum oxide layer of 15 nm in film thickness was formed on the film while introducing oxygen gas of purity 99.9% to aluminum of purity 99.9% melted and evaporated from a crucible under a plasma atmosphere of 1 Pa at 5×10$^{-4}$ torr. Lastly, the film of A4 size was detached from the carrier film for vapor deposition to obtain a gas barrier film 6. Adhesive force was evaluated for the gas barrier film 6 obtained, as a result, the water resistant adhesive force was 50 g/15 mm.

Example 7

A coating film 1 was obtained in the same manner as the method described in Example 1. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 1 cut to A4 size were attached so that the polyurethane resin layer surface was faced outside. Subsequently, using a winding type vacuum deposition apparatus, on the polyurethane resin layer surface, by spattering an ionized oxygen gas onto a target composed of 99.9% copper under a plasma atmosphere of 1 Pa, a copper-deposited layer of 10 ng/cm$^2$ in average thickness was formed. Subsequently, an aluminum oxide layer of 15 nm in film thickness was formed on the copper deposited layer while introducing oxygen gas of purity 99.9% to aluminum of purity 99.9% melted and evaporated from a crucible under a plasma atmosphere of 1 Pa at 5×10$^{-4}$ torr. Lastly, the film of A4 size was detached from the carrier film for vapor deposition to obtain a gas barrier film 7. Adhesive force was evaluated for the gas barrier film 7 obtained, as a result, the water resistant adhesive force was 400 g/15 mm.

Example 8

A coating film 2 was obtained in the same manner as the method described in Example 2. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 2 cut to A4 size were attached so that the polyurethane resin layer surface was faced outside. Subsequently, in the same manner as the method described in Example 7, a copper-deposited layer and an aluminum-deposited layer were formed to obtain a gas barrier film 8.

Example 9

A coating film 3 was obtained in the same manner as the method described in Example 3. Next, on a film roll of a biaxially stretched polyethylene terephthalate film of 12 Mm thickness as a carrier film for vapor deposition (manufactured by Toray Industries, Inc. "Lumilar" (trademark) 12T705), a plurality of the coating films 3 cut to A4 size were attached so that the polyurethane resin layer surface was faced outside. Subsequently, in the same manner as the method described in Example 7, a copper-deposited layer and an aluminum-deposited layer were formed to obtain a gas barrier film 9.

Comparative Example 1

In place of coating film 1, a biaxially stretched polyethylene terephthalate film of 12 μm thickness that one surface was subjected to corona discharge treatment (manufactured by Toray Industries, Inc. "Lumilar" (trademark) 12T705) was prepared (referred to as film A). On a film roll of a biaxially stretched polyethylene terephthalate film of 12 μm thickness as a carrier film for vapor deposition (manufactured by Toray Industries, Inc. "Lumilar" (trademark) 12T705), a plurality of the films A cut to A4 size were attached. Subsequently, in the same manner as the method described in Example 1, a copper-deposited layer and an aluminum-deposited layer were formed to obtain a gas barrier film 10.

Comparative Example 2

To "Hydran" (trademark) AP-30F (10 parts) manufactured by DIC Corporation, being an aqueous dispersion of polyurethane type resin not containing a skeleton structure represented by the formulas (1) and (2) with a solid content of 30 wt %, 44 parts of water and 6 parts of methanol were added as a diluting solvent, and stirred for 30 minutes to obtain a coating liquid 3 with 5% in solid content concentration. Next, on the treated surface side of a biaxially stretched polyethylene terephthalate film of 12 μm thickness that one surface was subjected to corona discharge treatment (manufactured by Toray Industries, Inc. "Lumilar" (trademark) 12T705), the coating liquid 3 was coated using a wire bar for the coated amount after drying to be 0.2 g/m$^2$, and dried at 120° C. for 20 seconds to obtain a coating film 6. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 6 cut to A4 size were attached so that the polyurethane resin layer surface was faced outside. Subsequently, in the same manner as the method described in Example 1, a copper-deposited layer and an aluminum-deposited layer were formed to obtain a gas barrier film 11.

Comparative Example 3

To "Takelac" (trademark) W-6010 (10 parts) manufactured by Mitsui Chemicals Polyurethanes, Inc., being an aqueous dispersion of polyurethane type resin not containing a skeleton structure represented by the formulas (1) and (2) with a solid content of 30 wt %, 44 parts of water and 6 parts of methanol were added as a diluting solvent, and stirred for 30 minutes to obtain a coating liquid 4 with 5% in solid content concentration. Next, on the treated surface side of abiaxially stretched polyethylene terephthalate film of 12 μm thickness that one surface was subjected to corona discharge treatment (manufactured by Toray Industries, Inc. "Lumilar" (trademark) 12T705), the coating liquid 4 was coated using a wire bar for the coated amount after drying to be 0.2 g/m$^2$, and dried at 120° C. for 20 seconds to obtain a coating film 7. Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the coating films 7 cut to A4 size were attached so that the polyurethane resin layer surface was faced outside. Subsequently, in the same manner as the method described in Example 1, a copper-deposited layer and an aluminum-deposited layer were formed to obtain a gas barrier film 12.

Comparative Example 4

Polyethylene terephthalate resin pellets were extruded from a nozzle of an extruder, casted on a cooling drum while being in concomitant use of static adhesion method to obtain an amorphous polyester sheet. The amorphous polyester sheet was stretched at 90° C. in the longitudinal direction by 3.4 times, then, further stretched at 110° C. in the lateral direction by 2.9 times, and heat-treated at a temperature of 228° C., thereby to obtain a biaxially stretched polyester film of 40 μm in thickness (referred to as film B). Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the films B cut to A4 size were attached. Subsequently, in the same manner as the method described in Example 1, a copper-deposited layer and an aluminum-deposited layer were formed to obtain a gas barrier film 13.

Comparative Example 5

A gas barrier film 14 was obtained in the same manner as the method described in Comparative example 1 except that in place of a biaxially stretched polyethylene terephthalate film of 12 μm thickness that one surface was subjected to corona discharge treatment (manufactured by Toray Industries, Inc. "Lumilar" (trademark) 12T705), a biaxially stretched polyethylene naphthalate film of 12 μm thickness that one surface was subjected to corona discharge treatment was used.

Comparative Example 6

A gas barrier film 15 was obtained in the same manner as the method described in Comparative example 1 except that in place of a biaxially stretched polyethylene terephthalate film of 12 μm thickness that one surface was subjected to corona discharge treatment (manufactured by Toray Industries, Inc. "Lumilar" (trademark) 12T705), a stretched polylactic acid film of 15 μm thickness that one surface was subjected to corona discharge treatment was used.

Comparative Example 7

A gas barrier film 16 was obtained in the same manner as the method described in Example 1 except that a biaxially stretched polyethylene terephthalate film of 12 μm thickness that one surface was subjected to corona discharge treatment (manufactured by Toray Industries, Inc. "Lumilar" (trademark) 12T705) was used in place of coating film 1.

Comparative Example 8

Polyethylene terephthalate resin pellets were extruded from a nozzle of an extruder, casted on a cooling drum while being in concomitant use of static adhesion method to obtain an amorphous polyester sheet. The amorphous polyester sheet was stretched at 90° C. in the longitudinal direction by 3.4 times, then, further stretched at 110° C. in the lateral direction by 2.9 times, and heat-treated at a temperature of 228° C., thereby to obtain a biaxially stretched polyester film of 40 μm in thickness (referred to as film C). Next, on a film roll of a biaxially stretched polyethylene terephthalate film of 12 μm thickness as a carrier film for vapor deposition (manufactured by Toray Industries, Inc. "Lumilar" (trademark) 12T705), a plurality of the films C cut to A4 size were attached. Subsequently, in the same manner as the method described in Example 7, a copper-deposited layer and an aluminum-deposited layer were formed to obtain a gas barrier film 17.

Comparative Example 9

A gas barrier film 18 was obtained in the same manner as the method described in Example 7 except the coating film 6 was used in place of the coating film 1.

Comparative Example 10

A gas barrier film 19 was obtained in the same manner as the method described in Example 7 except the coating film 7 was used in place of the coating film 1.

The results of Examples 1 to 5, and Comparative examples 1 to 6 that an aluminum deposited layer was provided are shown in Tables 1 and 2. The results of Examples 6 to 9, and Comparative examples 7 to 10 that an aluminum oxide deposited layer was provided are shown in Tables 3 and 4.

TABLE 1

| | | Substrate film | | Resin layer | | | Anchor deposited layer | | Deposited layer Inorganic | |
|---|---|---|---|---|---|---|---|---|---|---|
| | Sample | Resin | [mm] | Forming method | Constituent material | [g/m²] | Metal | [ng/cm²] | material | [nm] |
| Example 1 | Gas barrier film 1 | PET | 12 | Off-line coating | Polyurethane type resin 1 | 0.2 | Cu | 10 | Al | 20 |
| Example 2 | Gas barrier film 2 | PET | 12 | Off-line coating | Polyurethane type resin 2 | 0.2 | Cu | 10 | Al | 20 |
| Example 3 | Gas barrier film 3 | PET | 40 | In-line coating | Polyurethane type resin 1 | 0.1 | Cu | 10 | Al | 20 |
| Example 4 | Gas barrier film 4 | PEN | 12 | Off-line coating | Polyurethane type resin 1 | 0.2 | Cu | 10 | Al | 20 |
| Example 5 | Gas barrier film 5 | PLA | 15 | Off-line coating | Polyurethane type resin 1 | 0.2 | Cu | 10 | Al | 20 |
| Comparative Example 1 | Gas barrier film 10 | PET | 12 | □ | □ | □ | Cu | 10 | Al | 20 |
| Comparative Example 2 | Gas barrier film 11 | PET | 12 | Off-line coating | Hydran AP-30F | 0.2 | Cu | 10 | Al | 20 |
| Comparative Example 3 | Gas barrier film 12 | PET | 12 | Off-line coating | Takelac W-6010 | 0.2 | Cu | 10 | Al | 20 |
| Comparative Example 4 | Gas barrier film 13 | PET | 40 | □ | □ | □ | Cu | 10 | Al | 20 |
| Comparative Example 5 | Gas barrier film 14 | PEN | 12 | □ | □ | □ | Cu | 10 | Al | 20 |
| Comparative Example 6 | Gas barrier film 15 | PLA | 15 | □ | □ | □ | Cu | 10 | Al | 20 |

TABLE 2

| | Sample | Oxygen transmittance [cc/(m² × day × atm)] | Water vapor transmittance [g/(m² × day)] |
|---|---|---|---|
| Example 1 | Gas barrier film 1 | 0.23 | 0.22 |
| Example 2 | Gas barrier film 2 | 0.31 | 0.33 |
| Example 3 | Gas barrier film 3 | 0.17 | 0.15 |
| Example 4 | Gas barrier film 4 | 0.23 | 0.24 |
| Example 5 | Gas barrier film 5 | 3.2 | 0.75 |
| Comparative Example 1 | Gas barrier film 10 | 0.85 | 0.54 |
| Comparative Example 2 | Gas barrier film 11 | 0.7 | 0.5 |
| Comparative Example 3 | Gas barrier film 12 | 2.32 | 1.32 |
| Comparative Example 4 | Gas barrier film 13 | 0.64 | 0.42 |
| Comparative Example 5 | Gas barrier film 14 | 0.75 | 0.52 |
| Comparative Example 6 | Gas barrier film 15 | 22.2 | 1.51 | thane type resin layer containing a skeleton structure represented by the formula (1) or the formula (2) was provided and further an aluminum deposited layer was formed. Gas barrier film 10 (Comparative example 1) and gas barrier film 13 (Comparative example 4) are ones that a polyurethane type resin layer was not provided and an aluminum deposited layer was formed. Gas barrier film 11 (Comparative example 2) and gas barrier film 12 (Comparative example 3) are ones that a polyurethane type resin layer not containing a skeleton structure represented by the formula (1) and the formula (2) was provided and further an aluminum deposited layer was formed. It is found that gas barrier films 1 to 3 that a polyurethane type resin layer containing a skeleton structure represented by the formula (1) or the formula (2) was provided are all excellent in oxygen gas barrier property and water vapor barrier property as compared with gas barrier films 10 to 13.

Gas barrier film 1 (Example 1) and gas barrier film 2 (Example 2) are ones that a polyurethane type resin layer was formed by off-line coating method. Gas barrier film 3 (Example 3) is one that a polyurethane type resin layer was formed by in-line coating method. When gas barrier films 1 to 3 and gas barrier films 10, 13 are compared, as a means for forming a polyurethane type resin layer, it is found that by either technique of off-line coating method or in-line coating

TABLE 3

| | | Substrate film | | Resin layer | | | Anchor deposited layer | | Deposited layer Inorganic | |
|---|---|---|---|---|---|---|---|---|---|---|
| | Sample | Resin | [µm] | Forming method | Constituent material | [g/m²] | Metal | [ng/cm²] | material | [nm] |
| Example 6 | Gas barrier film 6 | PET | 12 | Off-line coating | Polyurethane type resin 1 | 0.2 | ☐ | ☐ | AlOx | 15 |
| Example 7 | Gas barrier film 7 | PET | 12 | Off-line coating | Polyurethane type resin 1 | 0.2 | Cu | 10 | AlOx | 15 |
| Example 8 | Gas barrier film 8 | PET | 12 | Off-line coating | Polyurethane type resin 2 | 0.2 | Cu | 10 | AlOx | 15 |
| Example 9 | Gas barrier film 9 | PET | 40 | In-line coating | Polyurethane type resin 1 | 0.1 | Cu | 10 | AlOx | 15 |
| Comparative Example 7 | Gas barrier film 16 | PET | 12 | ☐ | ☐ | ☐ | Cu | 10 | AlOx | 15 |
| Comparative Example 8 | Gas barrier film 17 | PET | 40 | ☐ | ☐ | ☐ | Cu | 10 | AlOx | 15 |
| Comparative Example 9 | Gas barrier film 18 | PET | 12 | Off-line coating | Hydran AP-30F | 0.2 | Cu | 10 | AlOx | 15 |
| Comparative Example 10 | Gas barrier film 19 | PET | 12 | Off-line coating | Takelac W-6010 | 0.2 | Cu | 10 | AlOx | 15 |

TABLE 4

| | Sample | Oxygen transmittance [cc/(m² × day × atm)] | Water vapor transmittance [g/(m² × day)] | Transparency evaluation Total light transmittance [%] | Haze [%] |
|---|---|---|---|---|---|
| Example 6 | Gas barrier film 6 | 0.20 | 0.38 | 89.6 | 2.2 |
| Example 7 | Gas barrier film 7 | 0.16 | 0.33 | 89.8 | 2.1 |
| Example 8 | Gas barrier film 8 | 0.30 | 0.48 | 89.5 | 2.2 |
| Example 9 | Gas barrier film 9 | 0.17 | 0.22 | 90.0 | 2.2 |
| Comparative Example 7 | Gas barrier film 16 | 1.13 | 0.71 | 89.6 | 2.3 |
| Comparative Example 8 | Gas barrier film 17 | 1.02 | 0.54 | 89.7 | 2.3 |
| Comparative Example 9 | Gas barrier film 18 | 1.01 | 0.72 | 89.8 | 2.2 |
| Comparative Example 10 | Gas barrier film 19 | 2.54 | 1.21 | 90.0 | 2.3 |

From comparison between each of Examples and each of Comparative examples, the followings are found.

Comparison Between Examples 1 to 3 and Comparative Examples 1 to 4

Gas barrier film 1 (Example 1), gas barrier film 2 (Example 2) and gas barrier film 3 (Example 3) are ones that a polyure- method, the oxygen gas barrier property and water vapor barrier property of a gas barrier film can be improved.

Comparison Between Examples 4 to 5 and Comparative Examples 5 to 6

Gas barrier film 4 (Example 4) and gas barrier film 5 (Example 5) are ones that a film composed of polyethylene naphthalate or polylactic acid was used as a substrate film, a polyurethane type resin layer containing a skeleton structure represented by the formula (1) or the formula (2) was provided and further an aluminum deposited layer was formed. Gas barrier film 14 (Comparative example 5) and gas barrier film 15 (Comparative example 6) are ones that a film composed of polyethylene naphthalate or polylactic acid was used as a substrate film, a polyurethane type resin was not provided and an aluminum deposited layer was formed. When gas barrier films 4, 5 and gas barrier films 5, 6 are compared, it is found that both are excellent in oxygen gas barrier property and water vapor barrier property. Therefore, it is found that the present invention is a technique not limited to polyethylene terephthalate film but applicable to other polyester type films.

Comparison Between Examples 6 to 9 and Comparative Examples 7 to 10

Gas barrier film 6 (Example 6), gas barrier film 7 (Example 7), gas barrier film 8 (Example 8) and gas barrier film 9 (Example 9) are ones that a polyurethane type resin layer containing a skeleton structure represented by the formula (1) or the formula (2) was provided and further an aluminum oxide deposited layer was formed. Gas barrier film 16 (Comparative example 7) and gas barrier film 17 (Comparative example 8) are ones that a polyurethane type resin layer was not provided and an aluminum oxide deposited layer was formed. When gas barrier films 6 to 9 that a polyurethane type resin layer containing a skeleton structure represented by the formula (1) or the formula (2) was provided are compared with gas barrier film 16 or 17, it is found that they are all excellent in oxygen gas barrier property and water vapor barrier property.

A film that an aluminum oxide deposited layer was formed exerts a high total light transmittance and low haze, and is a gas barrier film with excellent transparency.

Further, from comparison of gas barrier film 6 (Example 6) and gas barrier film 7 (Example 7), regardless of an anchor deposited layer being present or not, a gas barrier film that a polyurethane type resin layer containing a skeleton structure represented by the formula (1) or the formula (2) was provided exerts a high oxygen gas barrier property and water vapor barrier property. Here, water resistant adhesive force between a polyurethane type resin layer and an aluminum oxide layer is more improved by forming an anchor deposited layer.

As is clear from the result of each of Examples and Comparative examples described above, the barrier film of the present invention is a gas barrier film having higher barrier to oxygen and water vapor than any gas barrier film that a polyurethane type resin layer containing a skeleton structure represented by the formula (1) or the formula (2) was not provided.

INDUSTRIAL APPLICABILITY

The barrier film of the present invention is useful because it is used as a gas barrier film for packaging for foods and the like and can be applied to a barrier film for various kinds of packaging.

The invention claimed is:

1. A gas barrier film consisting of a polyurethane resin layer disposed on at least one surface of a polyester resin film, a metal anchor deposited layer disposed on said polyurethane resin layer, and an inorganic material layer disposed on said metal anchor deposited layer, wherein the polyurethane resin constituting said polyurethane resin layer is a resin containing a skeleton represented by the following formula (1) and/or the following formula (2), wherein the deposited amount of said metal anchor deposited layer is in a range of 5 to 1000 ng/cm²,

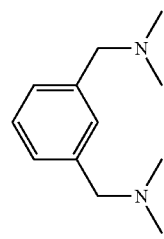

(1)

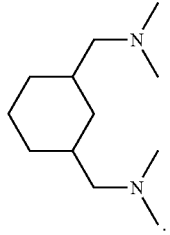

(2)

2. The gas barrier film according to claim 1, wherein the polyester resin constituting said polyester resin film is selected from the group consisting of polyethylene terephthalate, polyethylene naphthalate and polylactic acid.

3. The gas barrier film according to claim 1, wherein the coated amount of said polyurethane resin layer is in a range of 0.01 to 2.0 g/m².

4. The gas barrier film according to claim 1, wherein the metal constituting said metal anchor deposited layer is copper.

5. The gas barrier film according to claim 1, wherein the inorganic material constituting said inorganic material layer is a metal or an inorganic oxide.

6. The gas barrier film according to claim 5, wherein the metal constituting said inorganic material layer is aluminum.

7. The gas barrier film according to claim 5, wherein the inorganic oxide constituting said inorganic material layer is at least one kind of inorganic oxide selected from the group consisting of aluminum oxide, silicon oxide and silicon oxide-nitride.

8. The gas barrier film according to claim 2, wherein the metal constituting said metal anchor deposited layer is copper.

9. The gas barrier film according to claim 8, wherein the inorganic material constituting said inorganic material layer is a metal or an inorganic oxide.

10. The gas barrier film according to claim 1, wherein the inorganic material constituting said inorganic material layer is aluminum.

11. The gas barrier film according to claim 1, wherein the inorganic material constituting said inorganic material layer is at least one kind of inorganic oxide selected from the group consisting of aluminum oxide, silicon oxide and silicon oxide-nitride.

12. The gas barrier film according to claim 9, wherein the inorganic material constituting said inorganic material layer is aluminum.

13. The gas barrier film according to claim 9, wherein the inorganic material constituting said inorganic material layer is at least one kind of inorganic oxide selected from the group consisting of aluminum oxide, silicon oxide and silicon oxide-nitride.

* * * * *